H. B. HARTMAN.
ELECTROLYTIC WATER PURIFYING APPARATUS.
APPLICATION FILED MAR. 2, 1908.
943,187.
Patented Dec. 14, 1909.
2 SHEETS—SHEET 2.
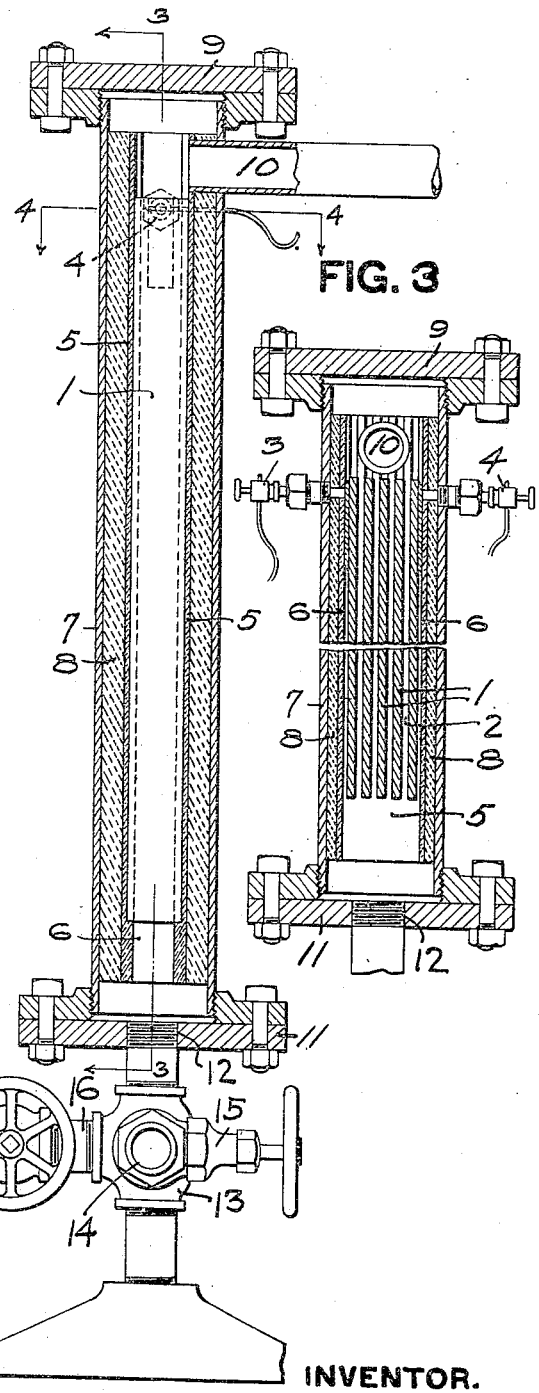
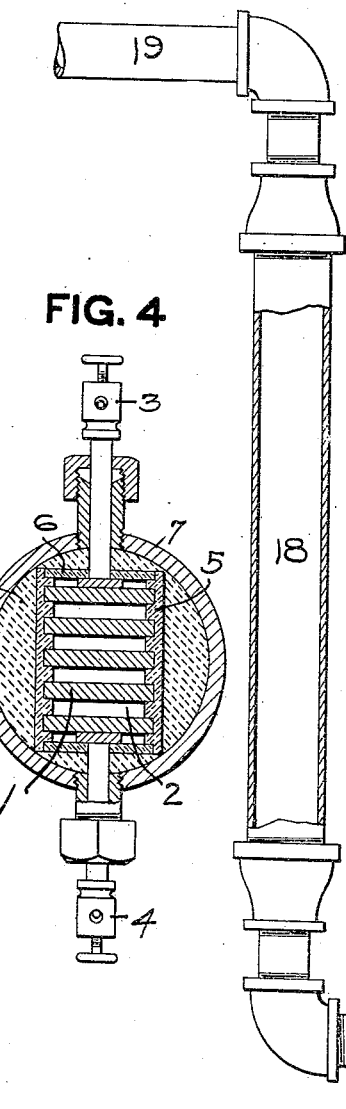
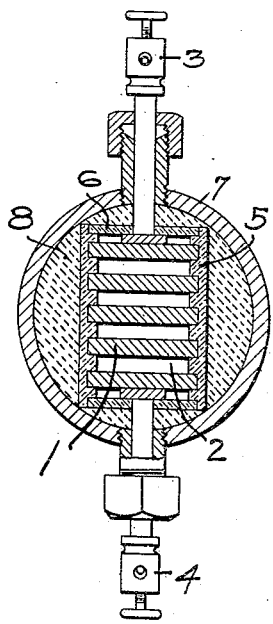
WITNESSES.
INVENTOR.

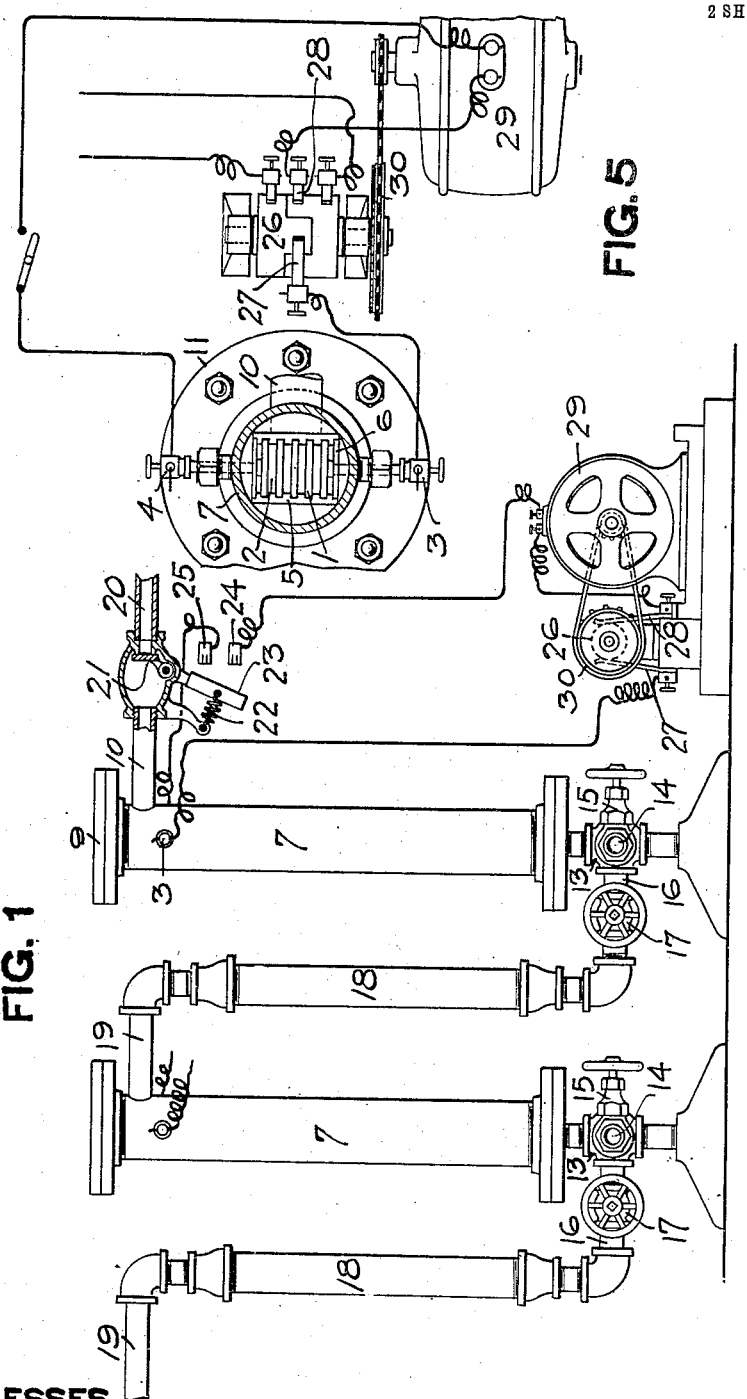

UNITED STATES PATENT OFFICE.

HARRY B. HARTMAN, OF PITTSBURG, PENNSYLVANIA, ASSIGNOR TO McDOWELL MANUFACTURING COMPANY, OF PITTSBURG, PENNSYLVANIA, A CORPORATION OF PENNSYLVANIA.

ELECTROLYTIC WATER-PURIFYING APPARATUS.

943,187.

Specification of Letters Patent.    Patented Dec. 14, 1909.

Application filed March 2, 1908. Serial No. 418,744.

*To all whom it may concern:*

Be it known that I, HARRY B. HARTMAN, a resident of Pittsburg, in the county of Allegheny and State of Pennsylvania, have invented a new and useful Improvement in Electrolytic Water-Purifying Apparatus; and I do hereby declare the following to be a full, clear, and exact description thereof.

This invention relates to liquid purifying apparatus, and especially to apparatus in which water is purified by passing between metallic plates or electrodes connected in an electric circuit.

The object of the invention is to improve apparatus of this character in order to render the same more efficient and economical.

The specific features of the improvement consist in an arrangement of apparatus to insure the plates being kept clean in order to develop their maximum efficiency, and also to give the oxygen generated in the apparatus time to act upon the impurities in the water to oxidize the same.

The above objects are accomplished by an arrangement of apparatus hereinafter described and claimed.

In the accompanying drawings Figure 1 is in part an elevation and in part a vertical section of apparatus constructed and arranged according to my invention, Fig. 2 is a vertical section on an enlarged scale through one of the units of the apparatus; Fig. 3 is a similar section at right angles to that of Fig. 2 through the electrode box; Fig. 4 is a cross section on the line 4—4, Fig. 2; and Fig. 5 is a plan view of the current reversing means.

The primary difficulty in electrolytic water purifying apparatus arises from the deposit of the impurities of the water on the plates. This soon creates such a resistance to the flow of current that the latter is so materially cut down as not to destroy or coagulate the organic matters in the water. Various arrangements have been devised with a view of overcoming this difficulty, but as far as I am aware these have not been very successful.

The primary object of this invention is to provide an arrangement of apparatus which insures the plates or electrodes being kept sufficiently clean to permit the flow of sufficient current to maintain the efficiency of the apparatus, and which also provides for the full action of the oxygen generated to destroy organic matter. This is accomplished, first, by providing electrodes or plates so arranged that the space therebetween through which the water flows is substantially equal to the inlet and outlet openings, thereby insuring a rapid flow of the water so as to carry away the deposit or coagulates, in connection with which I provide a flush opening so that the apparatus can be washed out with a full head of the water passing between the electrodes or plates; second, by providing means for periodically reversing the current and maintaining the current in both directions for substantially equal periods of time, thus insuring the throwing off from a plate all the deposit which may have formed thereon; and third, in providing a mixing chamber to which the water passes from the electrolytic device and in which the flow is materially reduced so as to give the oxygen generated in the electrolytic apparatus time to act upon the organic matter contained in the water.

The electrodes are shown at 1, these being comparatively narrow and long aluminum plates arranged vertically so as to allow between the same spaces or passages 2 through which the water or other liquid to be purified flows. Five such plates are shown, but obviously a greater or lesser number may be used as desired. The electric current is shown connected only to the two side plates of the series so as to provide intermediate bi-polar plates, but this is not absolutely essential. The electrical connections are made through the binding posts 3 and 4, one connected to each of the outside plates.

The plates are suitably insulated from each other, such as by having their edges fitting in grooves in plates 5 of suitable insulating material, preferably glass. The other two sides of the rectangle are closed by similar insulating plates 6. The box so formed is inclosed in a suitable casing, such as the pipe 7, with the spaces between the glass plates and the pipe filled by a suitable substance, such as cement 8. This provides a thorough insulation for the electrodes, but the construction is such that said electrodes may be removed by merely sliding them endwise up through the ends of the pipe. The upper end of the pipe 7 is closed by a removable head 9. The inlet 10 enters through the pipe 7 below the head 9 and preferably below the upper end of the insulation, as shown. The lower end of the pipe 7 is closed by a head 11 with the outlet opening 12 therethrough. This outlet opening communicates with a suitable T fitting 13, having connected to one side a flushing or wash-out pipe 14 controlled by a cut-off valve 15 and having connected to the other side a pipe 16 controlled by a cut-off valve 17 and which may lead to the service pipe, but preferably to a mixing chamber. The latter is shown as a pipe 18, preferably arranged vertically, as shown, and having connected to its upper end a pipe 19 leading to a service pipe or arranged to be connected to a second electrode casing, as shown. An electrode tube 7 with a mixing chamber 18 constitutes a unit and these can be multiplied as many times as necessary, being connected in series, two being shown in Fig. 1.

The parts are so designed and proportioned that the cross sectional area of the passages 2 between the electrodes is substantially equal to the cross sectional area of the inlet 10 and flushing outlet 14 so that when flushing, the water flows through the electrode chamber under the full head of the supply pressure, insuring washing from the plates any loose deposits that may adhere thereto. Preferably the plates are arranged vertically, as shown, so that the coagulum which is formed falls by gravity. The electrode chamber is cleaned from time to time by closing the valve 17 and opening the flush valve 15. The mixing chamber or pipe 18 is of materially greater cross sectional area than the inlet 10 and outlet 12 so that the rate of flow of the liquid therethrough is very materially decreased, giving the oxygen or ozone generated in the electrode chamber time to act upon and coagulate the organic matter held in the water. The entire apparatus is tightly closed so that the oxygen generated cannot escape.

In order to overcome deposits on the plates 1 due to the electrolytic action of the electric current, the latter is reversed from time to time so that any deposit formed on the plates is loosened up and washed away by the water flowing between the plates. This has heretofore been attempted, but in all cases, as far as I am aware, this reversal has been effected each time the service spigots are opened. As the service spigots are seldom open the same length of time in succession the current has been maintained a longer period of time in one direction than in the opposite direction, causing only an imperfect cleaning of the plates and a corresponding decrease of efficiency. I provide means for maintaining the flow of current for equal periods of time in alternate directions, thereby insuring the loosening up of any deposit that may have been formed on the surface of the plate. This may obviously be accomplished by various means. In the drawings only one means for this purpose is shown.

In the supply pipe 20 is a suitable shutter 21 so arranged that when water is flowing it swings in the direction of flow, as shown. A spring 22 serves to hold the shutter normally closed. Connected to this shutter is a suitable circuit closing arm 23 adapted when the shutter swings to open position to bridge terminals 24 and 25, closing the circuit to the binding posts 3 and 4. This is for the purpose of economizing current, making the circuit only when water is being drawn and breaking it when the service spigots are closed.

To periodically reverse the current I provide a suitable commutating device 26, this being shown of the rotating type and acting between brushes 27 and 28 connected in the circuit. This commutator is rotated by a suitable motor which is kept in motion only when the water is flowing. I have shown this motor as an electric motor 29 connected by suitable gearing 30 to the rotating commutator. The motor is connected in the circuit and hence is stopped and started by the circuit controller 23, so that as long as water is flowing the motor runs at a uniform speed, and through the commutator reverses the current at definite and equal intervals of time. Consequently, the current between the electrodes flows in both directions for equal lengths of time. An interval of thirty minutes between reversals has been found satisfactory, but I do not limit myself to that interval.

The apparatus is of simple construction and requires practically no attention. The current is automatically made and broken by the flow of the water, and is reversed automatically and at definite intervals of time. Consequently, any deposit formed on the plates when the current flows in one direction is removed when the current flows in the opposite direction. When flushing, the water flows through the restricted area between the plates with the full head of the supply, causing a very strong current and washing away the deposits which are loosened from the plates by the electric current, as well as all coagulum or precipitates formed between the plates. The plates are of such length that an effective action of the current on the water is obtained notwithstanding the rapid flow of the latter. The mixing chamber 18 in which the rate of flow of the water is largely decreased gives opportunity for the oxygen to act upon the inorganic matter in the water.

The apparatus described is primarily intended for the purification of water, as described, but obviously it may be used for the purification of liquids of any kind. The method disclosed herein is not claimed in this application but is claimed in a companion application filed concurrently herewith, Serial No. 418,745.

What I claim is:

1. Electrolytic liquid purifying apparatus comprising a plurality of long straight metallic electrodes, means for periodically reversing the current through said electrodes, and a casing inclosing said electrodes and arranged to cause all the liquid to flow between the electrodes and having inlet and outlet for the liquid, the cross sectional area of the space through said casing and electrodes being substantially equal to the cross sectional area of the inlet and of the outlet.

2. Electrolytic liquid purifying apparatus comprising a plurality of long, vertically arranged straight metallic electrodes, and a casing inclosing said electrodes and arranged to cause all the liquid to flow between said electrodes and having an inlet to its upper end and an outlet from its lower end, the cross sectional area of the space between the electrodes being substantially equal to the cross sectional area of the inlet and of the outlet.

3. Electrolytic liquid purifying apparatus comprising a plurality of long, vertically arranged electrodes, means for periodically reversing the current through said electrodes and a casing inclosing said electrodes and arranged to cause all the liquid to flow between the electrodes and having an inlet into its upper end, a valve-controlled service outlet from its lower end, and a valve-controlled flushing outlet from its lower end.

4. Electrolytic liquid purifying apparatus comprising a plurality of electrodes, electric terminals connected to the end electrodes of the series, leaving one or more intermediate bi-polar electrodes, and a casing inclosing said electrodes and arranged to cause all the liquid to flow between the electrodes and having an inlet and an outlet, the cross sectional area of the space between the electrodes being substantially equal to the cross sectional area of the inlet and of the outlet.

5. Electrolytic liquid purifying apparatus comprising a plurality of vertically arranged bi-polar electrodes, and a casing inclosing said electrodes and having an inlet at one end of the electrodes and an outlet at the opposite end of the electrodes, the cross sectional area of the passages between the electrodes in the casing being substantially equal to the cross sectional area of the inlet and of the outlet.

6. Electrolytic liquid purifying apparatus comprising a closed chamber, vertical electrodes in said chamber, inlet and outlet to said chamber at the top and bottom respectively, and a closed mixing chamber connected at its bottom to the outlet of said electrode chamber and being of greater cross sectional area than said electrode chamber in order to decrease the rate of flow of the liquid, and a service outlet from the top of said mixing chamber.

7. Electrolytic liquid purifying apparatus comprising a plurality of vertically arranged straight electrodes, means for periodically reversing the current through said electrodes, a closed casing containing said electrodes and provided with an inlet and an outlet, the cross sectional area of the space between the electrodes in said casing being substantially equal to the cross sectional area of the inlet and of the outlet, and a closed chamber connected to the outlet and of greater cross sectional area to decrease the speed of the flow of the liquid.

8. Electrolytic liquid purifying apparatus comprising a plurality of vertically arranged electrodes, means for periodically reversing the current through said electrodes, a casing inclosing said electrodes and having an inlet into its upper end and an outlet from its lower end, a casing separate from the electrode casing and providing a closed mixing chamber, a connection from its lower end to the outlet of the electrode casing, and a service connection from the upper end of said mixing chamber.

9. Electrolytic liquid purifying apparatus comprising a plurality of vertically arranged straight electrodes, a casing inclosing said electrodes and arranged to cause all the liquid to flow downwardly between the electrodes, said casing having an inlet and an outlet for the liquid, the cross sectional area of the space between the electrodes being substantially equal to the cross sectional area of the inlet and of the outlet, and means for periodically reversing the current through said electrodes.

10. Electrolytic liquid purifying apparatus comprising a plurality of electrodes, electric terminals connected to the end electrodes of the series to provide one or more intermediate bi-polar electrodes, a casing inclosing said electrodes and having an inlet and an outlet for the liquid, the cross sectional area of the space between the electrodes in the casing being substantially equal to the cross sectional area of the inlet and of the outlet, and means for periodically reversing the current to said electrodes.

11. Electrolytic liquid purifying apparatus comprising a plurality of long, vertically arranged electrodes, a casing inclosing said electrodes and having an inlet to its upper end and an outlet from its lower end, the cross sectional area of the liquid spaces in said casing being substantially equal to the cross sectional area of the inlet and of the outlet, a flushing outlet from the lower end of said casing and means for periodically reversing the current to said electrodes.

12. Electrolytic liquid purifying apparatus comprising a plurality of electrodes, terminals connected to the end electrodes of the series and providing one or more intermediate bi-polar electrodes, a casing arranged to cause the liquid to flow between the electrodes, and means for periodically reversing the current to the electrodes and maintaining the current in alternate direction for equal periods of time.

13. Electrolytic liquid purifying apparatus comprising a plurality of long straight vertically arranged metallic electrodes, a casing arranged to cause the liquid to flow between said electrodes and having an inlet and an outlet for the liquid, the cross sectional area of the liquid spaces through said casing being substantially equal to the cross sectional area of the inlet and of the outlet, and means for periodically reversing the current to the electrodes and maintaining the current in alternate directions for equal periods of time.

14. Electrolytic liquid purifying apparatus comprising electrodes arranged to have the liquid flow between the same, means for starting and stopping the flow of electric current by the starting and stoppage of the flow of the liquid, and means active only when the liquid is flowing for periodically reversing the current through said electrodes.

15. Electrolytic liquid purifying apparatus comprising a plurality of electrodes, a casing arranged to cause the liquid to flow between said electrodes, current reversing means, and a motor operated only when liquid is flowing through the apparatus and connected to said current reverser.

16. Electrolytic liquid purifying apparatus comprising a plurality of electrodes arranged to have the liquid flow between the same, means for periodically reversing the current through said electrodes, and means for rendering the reversing means inactive when the liquid is not flowing.

17. Electrolytic liquid purifying apparatus comprising a plurality of electrodes arranged to have the liquid flow between the same, means for synchronously starting and stopping the flow of liquid and current, means for periodically reversing the current through said electrodes, and means for rendering the reversing means inactive when the liquid is not flowing.

18. Electrolytic liquid purifying apparatus comprising electrodes arranged to have the liquid flow between the same, a reversing switch for changing the direction of the electric current through said liquid, and means when active arranged to automatically operate said reversing switch at uniform intervals, said means being rendered active and inactive by the flow of liquid.

19. Electrolytic liquid purifying apparatus comprising electrodes arranged to have the liquid flow between the same, current reversing means, a motor for operating said current reversing means, and means actuated by the starting and stopping of flow of liquid through the apparatus for stopping and starting said motor.

20. Electrolytic liquid purifying apparatus comprising electrodes arranged to have the liquid flow between the same, current reversing means, an electric motor for operating said current reversing means, and means actuated by the starting and stopping of flow of the liquid through the apparatus for making and breaking the circuit to said motor.

21. Electrolytic water purifying apparatus comprising electrodes arranged to have the liquid flow between the same, means for reversing the current through said electrodes, a motor for operating said current reversing means, and a flap arranged in the course of the flow of the liquid and actuated by the liquid and arranged to start and stop said motor with the starting and stopping of flow of liquid through the apparatus.

In testimony whereof, I, the said HARRY B. HARTMAN, have hereunto set my hand.

HARRY B. HARTMAN.

Witnesses:
 F. W. WINTER,
 ROBERT C. TOTTEN.